United States Patent [19]

Frehse

[11] Patent Number: 4,834,464
[45] Date of Patent: May 30, 1989

[54] MAGNETIC WHEEL BEARING CAP

[75] Inventor: Lloyd J. Frehse, Little Suamico, Wis.

[73] Assignee: CPR Systems Inc., DePere, Wis.

[21] Appl. No.: 140,230

[22] Filed: Dec. 31, 1987

[51] Int. Cl.[4] .......................... B60B 7/00; B01D 35/06
[52] U.S. Cl. .......................... 301/108 R; 301/108 TW;
210/222; 210/223; 384/624; 184/6.25
[58] Field of Search .......... 301/108 R, 108 S, 108 A,
301/108 TW; 210/222, 223; 384/624; 184/6.25

[56] References Cited

U.S. PATENT DOCUMENTS

| | | | |
|---|---|---|---|
| 1,281,842 | 10/1918 | Rosnick et al. | 210/222 X |
| 2,214,268 | 9/1940 | Brooks | 210/222 X |
| 2,622,942 | 12/1952 | Munoz | 184/6.25 X |
| 2,764,294 | 9/1956 | Johnson | 184/6.25 X |
| 3,316,022 | 4/1967 | Isenbarger | 301/108 TW |
| 3,367,722 | 2/1968 | Miyanaga | 301/37 R |
| 3,869,391 | 3/1975 | Kramer | 184/6.25 X |
| 4,752,759 | 6/1988 | Kazuyuki | 335/302 X |

FOREIGN PATENT DOCUMENTS

| | | | |
|---|---|---|---|
| 515512 | 1/1931 | Fed. Rep. of Germany | 184/6.25 |
| 590173 | 7/1947 | United Kingdom | 184/6.25 |
| 861078 | 2/1961 | United Kingdom | 210/222 |

Primary Examiner—Johnny D. Cherry
Assistant Examiner—Russell D. Stormer
Attorney, Agent, or Firm—Russell L. Johnson

[57] ABSTRACT

A plug for the wheel bearing hub assembly of a truck wheel bearing. The plug is a substantially unitary article having as a part of its construction a magnetic rod which, when the plug is in place in the hub, will lie along the axis of revolution of the wheel and project towards the wheel bearing and reside in a cup-like structure which is a part of the plug. The magnetic rod serves to collect metallic particles from the bearing lubricating fluid.

4 Claims, 1 Drawing Sheet

MAGNETIC WHEEL BEARING CAP

FIELD OF THE INVENTION

This invention relates to a means for removing metallic particles from the lubricating fluids of truck wheel bearings.

More particularly this invention relates to a means for removing metallic particles that are attracted to a magnet when they are present in the heavy weight oil which is used to lubricate the wheel bearings of large trucks.

BACKGROUND OF THE INVENTION

There are two periods in the life of a truck wheel bearing that small metallic particles are most likely to appear in the lubricating oil of truck wheel bearings. The first period is when the wheel bearing is new and the parts are seating. It is desirable to remove these particles from the fluid as they appear and thereby prolong the life on the bearings. The second period is when the bearing is nearing the end of its life and the bearing members begin to wear excessively. The presence of unusual amounts of metallic particles in the lubricating oil can signal the need to change wheel bearings.

A truck wheel bearing hub encloses a chamber that is roughly one fourth filled with lubricating oil. An access plug is centered in the hub cap assembly on the axis of revolution of the wheel and above the oil level. The wheel bearing is lubricated by the splashing of oil on the bearings due to the rotation of the wheel when the truck is moving.

OBJECTS

It is an object of this invention to provide a retrofitable access plug for the hub of truck wheel bearings that has as a part of its construction a magnetic rod which will collect metallic particles in the lubricating oil of the bearings.

It is further an object of this invention to provide a plug as described above wherein the plug is provided with a vent passage positioned relative to the magnetic rod so that clogging of the passage is highly unlikely.

It is further an object of this invention to provide a plug as described above wherein metallic particles which become magnetically attached to the magnetic rod will remain attached to the rod until removed during a wheel inspection.

It is further an object of this invention to provide a plug as decribed above wherein the plug remains flexible under conditions of freezing cold and is not prone to cracking under such conditions.

Other objects will become apparent from the following disclosures, drawings, and claims.

DISCUSSION OF THE PRIOR ART

Magnetized particle collectors for removing metallic particles from lubricating systems are well known in the art.

Retrofitable magnetized oil drain plugs are available for many internal combustion engines.

The prior art does not provide a magnetized metallic particle collector for a truck wheel and wheel bearing lubricating systems. One reason that, heretofore, no such magnetic collectors have been achieved for a truck wheel bearing lubricating system is that, in use, the wheel, the wheel bearing, and the wheel hub are all rotating. The dynamics and geometrics of the wheel, wheel bearing, axle, and hub presents no obvious opportunities for transferring magnetic particle collector techniques from prior art systems to the truck wheel bearing structures and dynamics.

Absent the teachings of this disclosure, the prior art does not suggest or make obvious the placing of a magnetic particle collector along the axis of rotation of a lubricating system at a location above the oil fill level and out of the principle oil flow paths.

BRIEF DESCRIPTION OF THE INVENTION

The invention in its simplest form is a retrofitable plug for the access port of a truck wheel bearing hub cap assembly. The plug has as a part of its structure a magnetic rod which, when the plug is in place in the hub cap assembly, will lie along the axis of revolution of the wheel and project towards the wheel bearing and reside in a cup-like structure which is a part of the plug. A vent passage passes between the inside of the plug and the outside of the plug.

DETAILED DESCRIPTION OF THE INVENTION

In the figures, like numbers refer to like objects.

Figure 1:
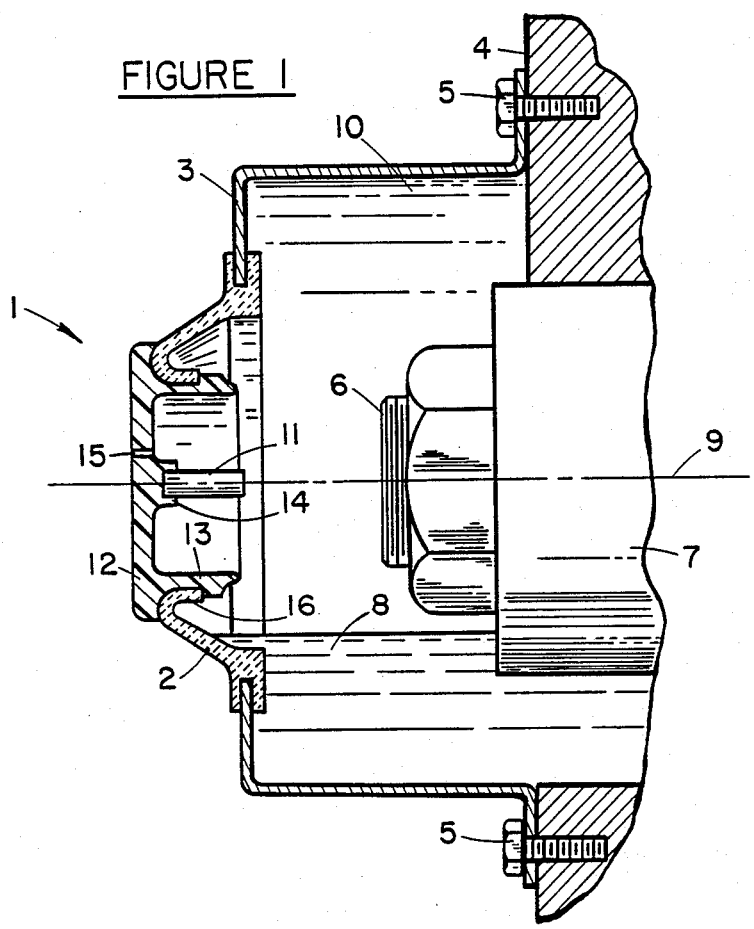
FIG. 1 is a sectioned elevational view showing the plug of this invention in place in a hub cap assembly.
Figure 2:
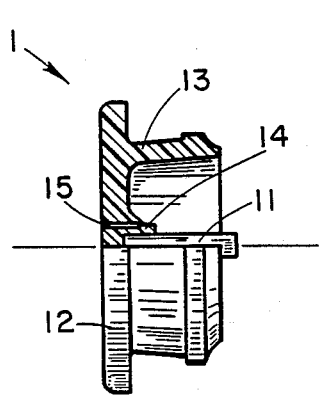
FIG. 2 is a half sectioned elevational view of the plug of this invention.
Figure 3:
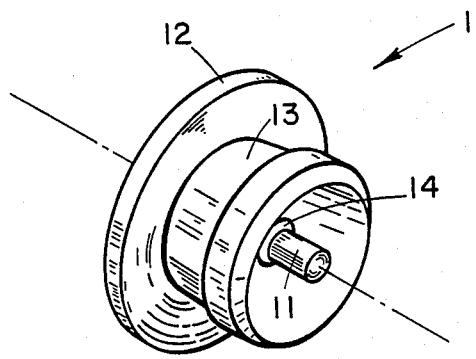
FIG. 3 is a pictorial view of the plug of this invention.

FIG. 1 shows magnetic plug 1 in place in viewing window 2 of wheel hub cap 3 which is secured to wheel hub 4 by means of bolts 5. Plug 1 is centered on axis of rotation 9 of axle 6. Lubricating oil 8 is retained in chamber 10 which is enclosed by hub cap 3 and wheel hub 4.

Lubricating oil 8 is splashed onto wheel bearings (not shown) mounted on axle shaft 7 when wheel hub 4 is revolving due to the movement of the vehicle to which it is mounted.

The two commonly employed locations for magnetic particle collectors in lubricating systems are in the oil reservoir and in the oil flow paths. In a truck wheel bearing lubricating system, the reservoir is rotating and changing continuously when in motion, and the dynamics of the oil flow stream are at times so chaotic as to splash or wash the collected particles from a collector in the oil flow paths and thereby return them to the oil. The prior art does not teach the placing of a magnetic particle collector out of the oil reservoir and out of the principle oil flow paths.

Plug 1 carries magnetic rod 11 so as to position magnetic rod 11 along axis of revolution 9 of axle 6 when plug 1 is in place in access port 16 of window 2 of hub cap 3.

While the physics of the workings of magnetic rod 11 to collect metallic particles from oil 8 are imperfectly understood by the inventor, a hindsight analysis of why magnetic rod 11 does indeed collect and hold metallic particles might include the assumptions that; oil is continuously splashed on all internal parts of chamber 10 when the vehicle is in motion, the positioning of rod 11 along the axis of revolution 9 of axle 6 serves to minimize the dynamic forces which would tend to cause the collected particles to be dislodged from magnetic rod 11 due to the movements of the wheel, and that the cup-like structures surrounding magnetic rod 11 tend to minimize the force with which oil 8 impinges on magnetic rod 11 and thereby reduces the degree to which the particles tend to be washed away from magnetic rod 11.

The above disclosure communicates the utilities, discoveries, and modes of operation that are a part of this invention. In order to each the best mode of practicing the invention it is necessary for the inventor to disclose additional discoveries and inventive content which are a part of his invention.

Plug 1 has a cap 12 having cup 13 and rod support 14 formed integrally therewith.

In practice in air in chamber 10 expands and contracts with the heating and cooling of the wheel bearings. A vent 15 is provided in cap 12 so as to prevent a pressure build up from expelling plug 1 or a vacuum build up from preventing the nondestructive removal of plug 1.

Prior art access plugs have tended to become nearly rigid when cold and often are irreparably damaged or cracked when being removed in cold weather, or window 2 may be damaged due to the rigidity of prior art access plugs in cold weather. This problem is solved by the instant invention by making the walls of cup 13 as thin as is practical and by forming plug 1 of a thermoplastic elastomeric such as thermoplastic rubber and polyurethane which have shown themselves to perform satisfactorily under the conditions to which plug 1 is subjected. The useful range of wall thicknesses for cup 13 are between 0.050 inches and 0.150 inches with thicknesses in order of 0.100 inches being preferred.

When the walls of cup 13 are formed sufficiently thin so as to permit the nondestructive removal of plug 1 in cold weather, it has been found necessary to provide a taper to the outside wall of cup 13 in order to assure the establishing of and the maintenance of a reliable seal by plug 1.

Magnetic rod 11 may be a permanent metal magnet or one of the magnetic plastics such as one of the magnetized ferrite materials with a polyethylene or nylon binder.

The inventor has provided an enabling disclosure that teaches the preferred embodiments of the invention and the best modes for practicing the invention known to him at the time of filing this patent application.

However, the invention should not be limited to the above disclosed embodiments. The invention should be limited only by the scope of the appended claims and all equivalents thereto that would become apparent to one skilled in the art.

I claim:

1. A magnetic, metallic particle collecting, plug which is sealably fitable into an access port of a truck wheel hub cap assembly so as to position the plug above the liquid level of a lubricating fluid in a reservoir of the assembly and also to position the plug to one side of the intended flow paths of the lubricating fluid within the assembly and the plug comprises; a substantially unitary plug structure of molded thermoplastic elastomeric material such as a thermoplastic rubber, polyurethane or the like and having;
    (a) a disc shaped cap having a broad outside surface and a broad inside surface and a central axis perpendicular to the broad surfaces,
    (b) a central rod support structure symmetrical about the axis and projecting inward from the inside surface,
    (c) a magnetic rod secured in the rod support structure and the magnetic rod is coaxial with the cap, and
    (d) a cup surrounding and spaced apart from the magnetic rod and rod support.

2. The plug of claim 1 wherein the magnetic rod is a permanent magnet.

3. The plug of claim 2 wherein the cup is provided with a vent passage which is parallel to the axis of the cap and which communicates between the inside surface of the cap and the outside surface of the cap.

4. A metallic particle collecting magnetic plug in combination with a hub cap assembly for a truck wheel bearing and comprising; a substantially unitary plug having;
    (a) a disc shaped cap having a central axis and having an inside surface and an outside surface,
    (b) a magnetic rod coaxial with the axis of the cap and projecting inward from the inside surface of the cap, and
    (c) a cup surrounding the magnetic rod and spaced apart from the rod and the cup is in sealing engagement with an access port in the wheel hub cap assembly where it is positioned above the level of the lubricating fluid in the assembly and positioned out of the intended flow paths of the lubricating fluid in the assembly.

* * * * *